United States Patent
Zhang

(10) Patent No.: US 10,746,333 B2
(45) Date of Patent: *Aug. 18, 2020

(54) GARDEN HOSE WITH METAL SHEATH

(71) Applicant: E. MISHAN & SONS, INC., New York, NY (US)

(72) Inventor: Feibiao Zhang, Jinhua Zhejiang (CN)

(73) Assignee: E. Mishan & Sons, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,719

(22) Filed: Jun. 26, 2018

(65) Prior Publication Data

US 2018/0347738 A1    Dec. 6, 2018

Related U.S. Application Data

(63) Continuation of application No. 15/638,057, filed on Jun. 29, 2017, now Pat. No. 10,591,098.

(51) Int. Cl.
*F16L 35/00* (2006.01)
*F16L 33/22* (2006.01)
(Continued)

(52) U.S. Cl.
CPC ............. *F16L 33/223* (2013.01); *F16L 11/10* (2013.01); *F16L 13/147* (2013.01);
(Continued)

(58) Field of Classification Search
CPC ......... E03C 1/04; E03C 1/0401; B05B 1/185; F16L 33/2078; F16L 35/00; F16L 33/01; F16L 13/147; F16L 11/10; F16L 33/2071; F16L 33/003; F16L 33/26; F16L 57/005; F16L 35/005; F16L 13/14; F16L 13/141;
(Continued)

(56) References Cited

U.S. PATENT DOCUMENTS 2,187,347 A    1/1940   Guamaschelli
2,797,474 A    1/1957   Main, Jr.
(Continued)

FOREIGN PATENT DOCUMENTS

DE    1450408 A1 *  7/1969  .............. F16L 33/00
DE    7042262 U    11/1970
(Continued)

OTHER PUBLICATIONS

Webster's New Twentieth Century Dictionary of the English Language (2d Ed. 1983) p. 526.
(Continued)

*Primary Examiner* — David Bochna
*Assistant Examiner* — James A Linford
(74) *Attorney, Agent, or Firm* — Notaro, Michalos & Zaccaria P.C.

(57) ABSTRACT

A garden hose with an outer flexible sheath of spirally wound and linked turns of sheet material, an inner tube of flexible polymer inside the sheath and end couplers with nipples press fit into ends of the tube and connector mechanisms connecting the couplers to the outer sheath. Each connector mechanism has inner and outer press fit shells at the end of the sheath, with flared ends separated by a washer.

9 Claims, 3 Drawing Sheets

(51) Int. Cl.

| | | |
|---|---|---|
| *F16L 33/00* | (2006.01) | |
| *F16L 33/26* | (2006.01) | |
| *F16L 33/207* | (2006.01) | |
| *F16L 33/01* | (2006.01) | |
| *F16L 13/14* | (2006.01) | |
| *F16L 11/10* | (2006.01) | |
| *F16L 57/00* | (2006.01) | |

(52) U.S. Cl.
CPC ............ *F16L 33/003* (2013.01); *F16L 33/01* (2013.01); *F16L 33/2071* (2013.01); *F16L 33/2078* (2013.01); *F16L 33/26* (2013.01); *F16L 35/00* (2013.01); *F16L 35/005* (2013.01); *F16L 57/005* (2013.01)

(58) Field of Classification Search
CPC ..... F16L 13/142; F16L 13/143; F16L 13/161; F16L 13/166
USPC .... 138/109, 118, 119; 4/615, 601, 567, 570, 4/675, 678
See application file for complete search history.

(56) References Cited

U.S. PATENT DOCUMENTS

| | | | |
|---|---|---|---|
| 3,623,513 | A | 11/1971 | Dinkelkamp |
| 3,682,203 | A | 8/1972 | Foti |
| 4,197,728 | A | 4/1980 | McGowen |
| 4,603,888 | A | 8/1986 | Goodall |
| 4,620,569 | A | 11/1986 | von Glanstatten |
| 4,683,917 | A | 4/1987 | Bartholomew |
| 4,669,757 | A | 6/1987 | Bartholomew |
| D296,355 | S | 6/1988 | Kanao |
| D296,356 | S | 6/1988 | Kanao |
| 5,669,420 | A | 9/1997 | Herrero |
| 5,868,435 | A | 2/1999 | Bartholomew |
| 6,053,212 | A | 4/2000 | Thomas |
| 6,106,027 | A | 8/2000 | Mulvey |
| 6,155,303 | A | 12/2000 | Krawietz |
| 6,311,736 | B2 | 11/2001 | Herman |
| 6,386,594 | B1 | 5/2002 | Schuttler |
| 6,427,727 | B1 | 8/2002 | Thomas |
| 6,488,052 | B2 | 12/2002 | Hupertz |
| 6,513,552 | B1 | 2/2003 | Shepard |
| 6,543,488 | B2 | 4/2003 | Foti |
| D488,544 | S | 4/2004 | Akaltan |
| 6,729,355 | B2 | 5/2004 | Vohrer |
| 6,817,082 | B2 | 11/2004 | Grepaly |
| 6,971,414 | B2 | 12/2005 | Vohrer |
| 7,066,497 | B2 | 6/2006 | Fullbeck |
| 7,121,591 | B2 | 10/2006 | Foti |
| 7,418,770 | B2 | 9/2008 | Steingass |
| D586,435 | S | 2/2009 | Reckseen |
| D611,576 | S | 3/2010 | Tokuno |
| 7,735,524 | B2 | 6/2010 | Burke |
| 8,079,619 | B2 | 12/2011 | Witz |
| D671,196 | S | 11/2012 | Montalvo |
| D687,513 | S | 8/2013 | Williams et al. |
| 8,888,139 | B2 | 11/2014 | Hunter |
| D748,763 | S | 2/2016 | Berardi |
| D748,764 | S | 2/2016 | Berardi |
| 9,441,766 | B2 | 9/2016 | Witz |
| D777,888 | S | 1/2017 | Vaz |
| D782,623 | S | 3/2017 | Vaz |
| D784,497 | S | 4/2017 | Vaz |
| D785,141 | S | 4/2017 | Vaz |
| 9,625,071 | B2 | 4/2017 | Melo |
| 9,638,359 | B2 | 5/2017 | Rothfuss |
| 2005/0023830 | A1 | 2/2005 | Chung |
| 2010/0154912 | A1 | 6/2010 | Wu |
| 2010/0154915 | A1 | 6/2010 | Wu |
| 2011/0247714 | A1 | 10/2011 | Kanao |
| 2012/0234424 | A1 | 9/2012 | Bernhardt |
| 2016/0138737 | A1 | 5/2016 | Hariram |

FOREIGN PATENT DOCUMENTS

| | | | |
|---|---|---|---|
| DE | 2115238 A1 | * 10/1972 | ............ F16L 19/065 |
| FR | 2613025 A1 | * 9/1988 | ............ E03C 1/021 |
| FR | 2734337 A1 | * 11/1996 | |
| FR | 2734337 A1 | 11/1996 | |

OTHER PUBLICATIONS

European Examination Report in European Patent Application No. 18275092.7.

* cited by examiner

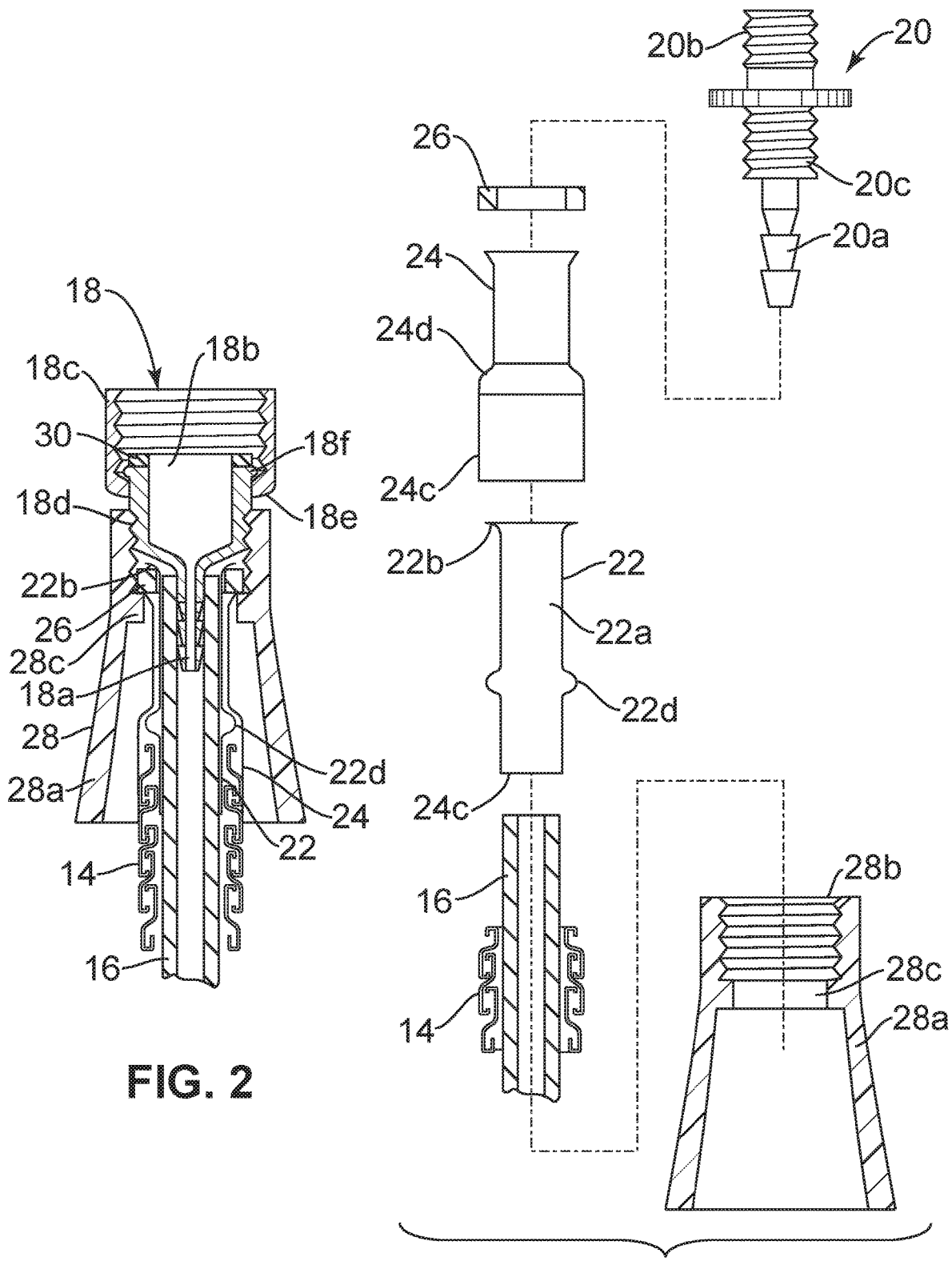

GARDEN HOSE WITH METAL SHEATH

This application is a continuation of U.S. patent application Ser. No. 15/638,057, filed Jun. 29, 2017, which is hereby incorporated by reference for all purposes.

FIELD AND BACKGROUND OF THE INVENTION

The present invention relates generally to the field of garden hoses and in particular to a new and useful garden hose that is stronger and more kink-resistant than currently known garden hoses.

A wide variety of garden hoses are known. Conventional garden hoses use heavy, multi-layered hose bodies in an attempt to keep the hose from kinking when pulled along but with limited success.

Newer expandable hoses exemplified by U.S. Pat. No. 8,291,942, resist kinking when inflated with water under pressure and thus expanded, but this requires an extra step of waiting for the hose to expand.

Metal clad, water hoses are also known, for use usually to connect hand-held shower heads to a source of water. See for example, U.S. Pat. No. 6,971,414. Such metal-cladding has also been suggested for use at the ends of a garden hose, but not for its entire body length. See for example U.S. Pat. No. 9,625,071.

A need remained for a kink-resistant garden hose that is relatively light, yet strong and flexible.

SUMMARY OF THE INVENTION

It is an object of the present invention to provide an improved garden hose that is clad with a spirally wound sheath of metal, preferably stainless steel, so as to resist kinking, crushing, punctures and other damage that other garden hoses are susceptible to, while being light and flexible.

So as to be practical as a garden hose for general and special purposes, the hose body is at least 10 feet or at least about 10 feet (about 3 meters) long and may be provided in various lengths including, for example, 25 feet or about 25 feet (about 7.6 meters), 50 feet or about 50 feet (about 15.2 meters), 100 feet or about 100 feet (about 30 meters) or longer.

Another object of the present invention to provide a garden hose which comprises a hose body having an outer flexible sheath of spirally wound and linked turns of sheet material, an inner tube of flexible polymer inside the sheath, first and second couplers with respective first and second nipples press fit into respective opposite ends of the inner tube, the first coupler being adapted to connect to a water source and the second coupler being adapted for discharging water from the hose, and a pair of connector mechanisms, each connecting one of the couplers to a respective end of the outer sheath. Each connector mechanism has an inner shell with a flared end press fit over an end of the inner tube into which one nipple is inserted, the inner shell having an opposite unflared end extending partly into an adjacent end of the sheath, and the inner shell including an annular enlargement between its ends. An outer shell is over the inner shell. The outer shell has a flared end spaced outwardly of the flared end of the inner shell, the outer shell having a large diameter portion and an opposite unflared end over the annular enlargement and unflared end of the inner shell. A fixing washer is between the flared ends and the large diameter portion and unflared end of the outer shell are press fit to the annular enlargement and unflared end of the inner shell, with an end of the sheath positively fixed between the shells.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a sectional view of the female end of the hose of FIG. 1, in its assembled condition;

FIG. 3 is an exploded view, partly in section, of the male end of the hose of FIG. 1, in its pre-assembled condition;

DESCRIPTION OF THE PREFERRED EMBODIMENTS

Figure 1:
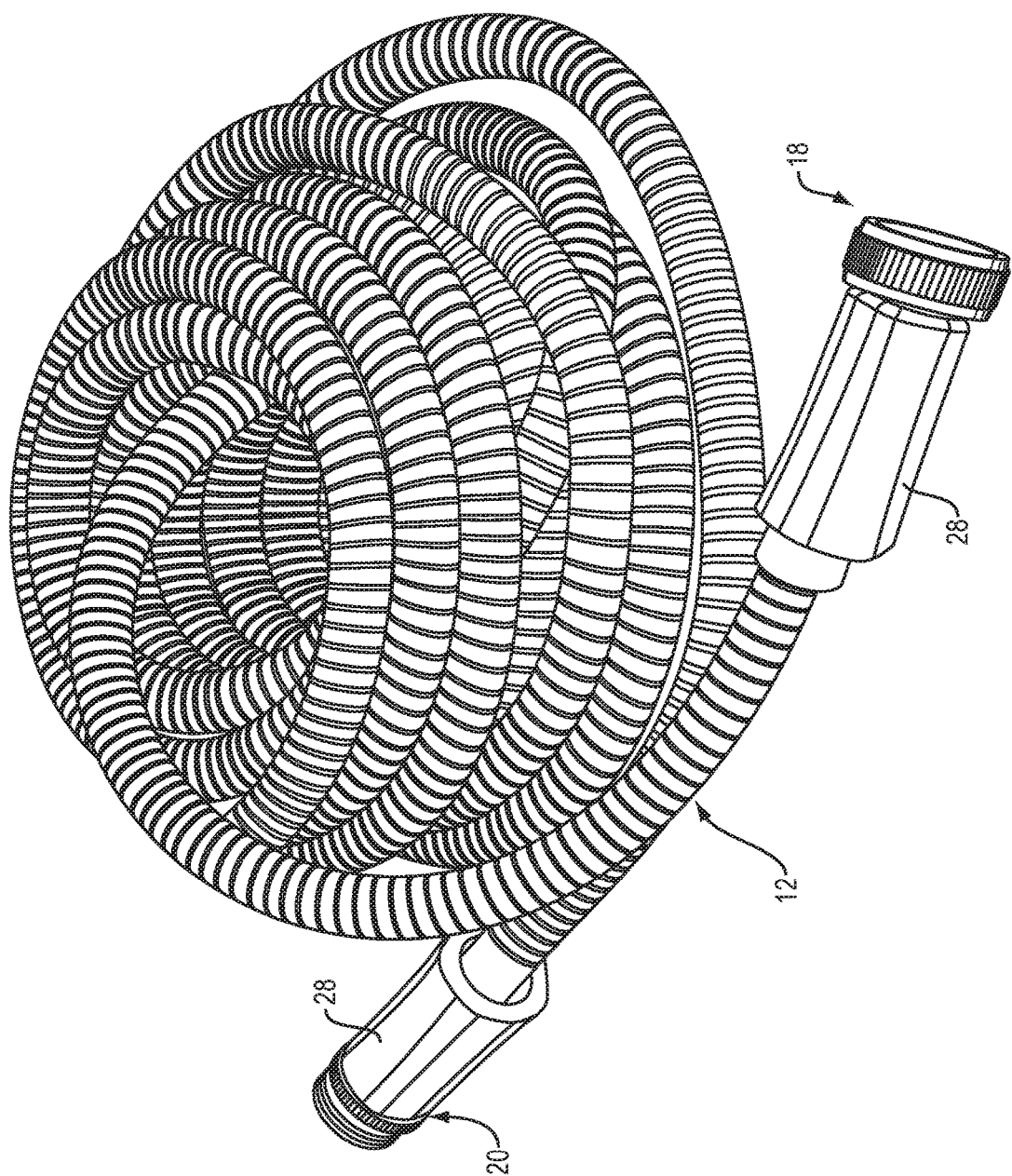
FIG. 1 is a perspective view of the garden hose of the invention.

Referring now to the drawings, in which like reference numerals are used to refer to the same or similar elements, FIG. 1 shows a garden hose comprising a hose body 12 of at least about 10 feet in length, but longer for practical use as a water hose in residential, commercial and/or industrial environments.

A first coupler 18 is firmly connected to one end of the hose body for connecting the garden hose to a water source, typically a water faucet, and a second coupler 20 is firmly connected to the opposite end of the hose body for discharging water from the garden hose. Typically, in the United States, the first coupler 18 is a female threaded coupler that can be screwed onto the male threads of a male faucet connection and the second coupler 20 is typically a male treaded coupler that is the same as the faucet connection. Alternative couplers that are treaded or not treaded, and/or snap on and off a mating faucet, and may be male or female may be used within the invention, depending on the convention that is prevalent in the region of use.

As will be explained in greater detail later in this disclosure, the garden hose of the invention also includes tapered sleeves 28 that are connected to the couplers 18 and 20, and that extend around adjacent ends of the hose body 12 to prevent over bending of an outer sheath 14 of the hose body, near each coupler.

Figure 4:
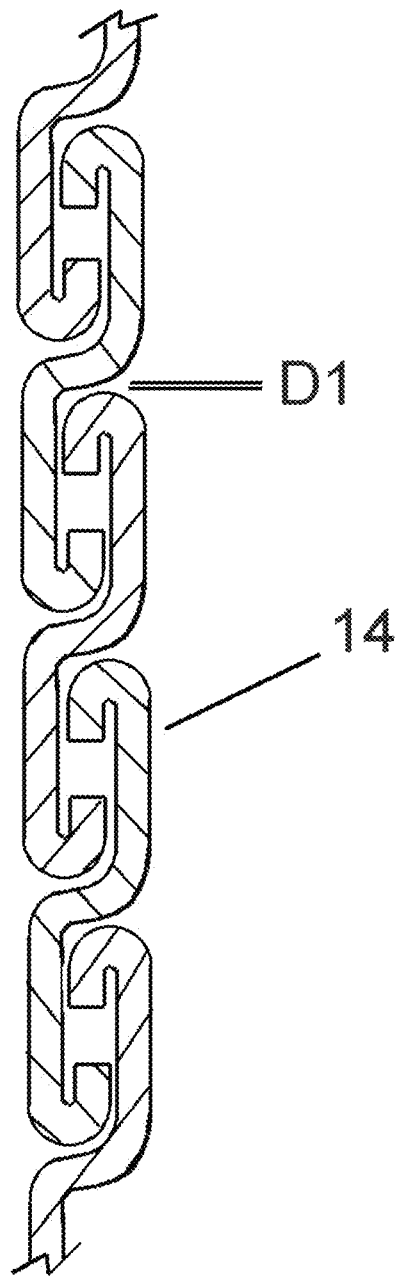
FIG. 4 is a sectional view of one half of the spiral metal cladding of the hose body of the invention, in a compressed condition.
Figure 5:
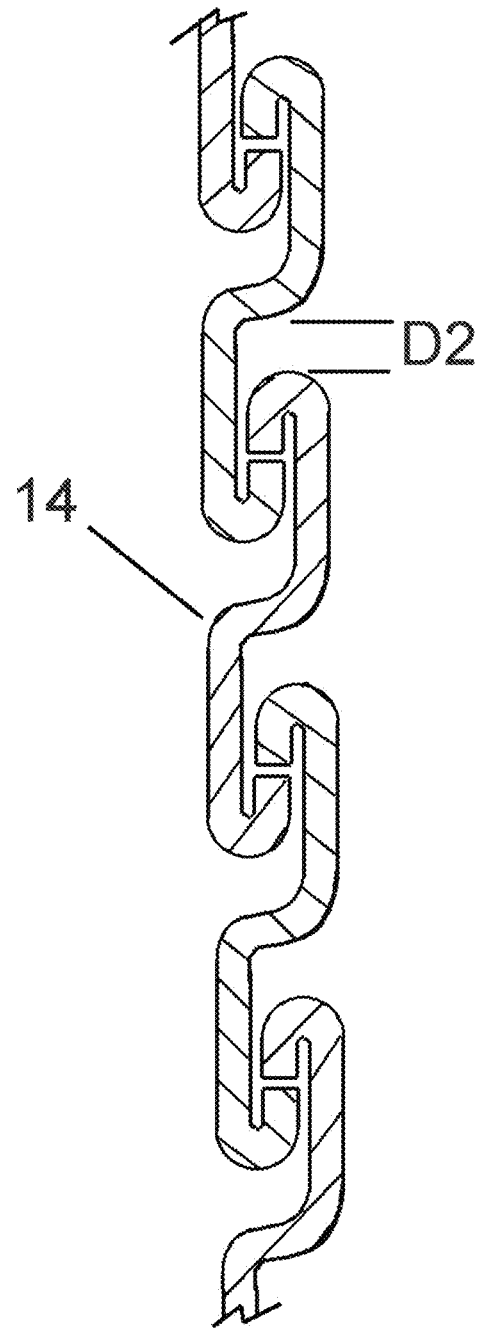
FIG. 5 is a sectional view of one half of the spiral metal cladding of the hose body of the invention, in an expanded condition.

A best shown in FIGS. 2 and 3, the hose body comprises the outer sheath 14 which is made of spirally wound turns of sheet metal, with each turn interlinked with a next turn along the hose body so that the turns are capable of moving with respect to each other to render the hose body flexible. This interlinking is shown in FIG. 4, where the turns are close to each other, e.g. by space or distance D1, and in FIG. 5 where they are spaced from each other by space or distance D2. This relative movement of the links is permitted due to the flexibility of the metal of the sheath, which is preferably stainless steel, and allows the hose body as a whole to be flexible as is evident in FIG. 1 showing the hose coiled for storage.

The material of sheath 14 may alternatively be another type of sufficiently flexible metal or even a hard but somewhat flexible plastic such as polycarbonate or the like.

Returning to FIGS. 2 and 3, the hose body also comprises an inner tube 16 of flexible polymer material inside, and extending along the length of the outer sheath 14. Inner tube 16 is made of a clear vinyl but other flexible, clear, translucent or opaque, colored or non-colored polymer tubing may be used, as long as it is water proof and strong enough to withstand domestic, commercial or industrial water pressure from within, with the aide of its outer sheath 14.

The couplers 18 and 20, each made of metal or strong plastic, have a nipple 18a and 20a, press fit into one respective end of the inner tube 16.

A pair of connector mechanisms are provided, each for connecting one of the couplers 18 and 20, to respective ends of the outer sheath 14. For this purpose, each connector mechanism comprises an inner metal shell 22, preferably of metal such as stainless steel, having an inner hollow cylindrical body 22a engaged over one end of the inner tube 16, the inner cylindrical body 22a having a flared end 22b press fit over the one end of the inner tube 16 into which the nipples 18a or 20a are inserted. The inner cylindrical body 22a also has an opposite unflared end 22c and includes an annular enlargement 22d between the ends thereof, with at least a portion of the inner cylindrical body 22a including the opposite unflared end 22c, being inside one end of the outer sheath 14.

Each connector mechanism also includes an outer metal shell 24 of metal, again preferably stainless steel, having an outer hollow cylindrical body 24a engaged over the inner cylindrical body 22a. The outer hollow cylindrical body 24a having a flared end 24b adjacent to, but spaced outwardly of the flared end 22b of the inner cylindrical body 22a. The outer hollow cylindrical body 24a has a large diameter portion 24d and an opposite unflared end 24c at the large diameter portion 24d, the large diameter portion 24d being over the annular enlargement 22d of the inner hollow cylindrical body 22a and the portion of the inner cylindrical body that is inside the one end of the outer sheath 14.

A fixing washer 26 is provided in the space between the flared ends 22b and 24b of the inner and outer cylindrical bodies 22a, 24a. The large diameter portion 24d and unflared end 24c of the outer hollow cylindrical body 24a is press fit radially inwardly to the annular enlargement 22d and the unflared end 22c of the inner hollow cylindrical body 22a with the one end of the outer sheath 14 being between portions of the inner and outer shells 22 and 24, for positively fixing the shells to the outer sheath 14. To this end the end of the sheath 14 may even extend to the space between the large diameter portion 24d and the annular enlargement 22d.

To form this press fit, pressing tools are used that simultaneously press the large diameter portion 24d radially inwardly while deforming the annular enlargement 22d radially outwardly, from is solid line cylindrical condition shown in FIG. 3, to its dotted line condition in that figure, and as it appears in final form in FIG. 2.

During this pressing and deforming operation for securing the shells 22 and 24, the fixing washer 26, preferably made of nylon or other strong plastic, keeps the shells properly spaced from each other axially, and serves as a stop against which a ring or step portion 28c of each sleeve 28 engages, as will be explained below.

Each connector mechanism also includes hollow sleeve 28 having a body 28a extending around the outer metal shell 24 and one end 28b fixed to one of the couplers, the body 28a of the hollow sleeve 28 having the inner small diameter ring or step portion 28c engaged behind the fixing washer 26 for positively securing the shells 22 and 24, and therefore the ends of inner and outer hose parts 14 and 16, to the couplers 18 and 20. To this end, the sleeve 28 has a female thread 28b that is securely threaded to a male threaded portion 18d and 20c of the respective coupler 18 and 20.

Referring to FIG. 2, the preferred first coupler 18 for use in the U.S., is a female coupler with a fixed portion 18b connected to the first nipple 18a, and a moveable, i.e. rotatable, portion 18c movably mounted to the fixed portion 18b, and a water sealing washer 30, made for example of soft polymer, engaged to the fixed portion for water sealing the first coupler to a source of water. The fixed and movable portions 18b and 18c each have interfering flanges 18e and 18f for trapping the movable portion 18c to the fixed portion 18b but allowing some axial and free rotational relative movement between these parts. Movable portion 18c of coupler 18 is internally threaded to be threadably connected to a water faucet.

As shown in FIG. 3, the male second coupler 20 has an externally threaded portion 20b that is made as one piece with the threaded portion 20c. Coupler 20 also includes an integral, outwardly grooved or knurled holding disc between its portions 20b and 20c, to help a user firmly hold the coupler 20 while threading a nozzle or spray head or otherwise connecting the coupler 20 to other accessories, or even the female coupler of another hose to extend the effective length of the hose.

While a specific embodiment of the invention has been shown and described in detail to illustrate the application of the principles of the invention, it will be understood that the invention may be embodied otherwise without departing from such principles.

What is claimed is:

1. A garden hose comprising:
   a hose body (12) of at least about 10 feet in length;
   the hose body comprising a flexible metal outer sheath (14), and an inner tube (16) of flexible, waterproof polymer material strong enough to withstand domestic water pressure, the inner tube being inside and extending along the length of the outer sheath (14);
   a first coupler (18) having a first nipple (18a) press fit into a first end of the inner tube (16), the first coupler (18) being adapted to connect the garden hose to a water faucet;
   a second coupler (20) having a second nipple (20a) press fit into a second end of the inner tube (16), the second coupler (20) being adapted for discharging water from the garden hose;
   a first connector connecting the first coupler to a first end of the outer sheath and a second connector connecting the second coupler to a second end of the outer sheath;
   wherein the first connector or the second connector comprises:
      an inner metal shell (22) having an inner hollow cylindrical body (22a) engaged over one end of the inner tube (16), the inner cylindrical body (22a) having a flared end (22b) press fit over the one end of the inner tube (16) into which the nipple (18a, 20a) of one of the couplers is inserted, the inner cylindrical body (22a) also having an opposite unflared end (22c), the inner cylindrical body (22a) including an annular enlargement (22d) between the ends thereof, with at least a portion of the inner cylindrical body (22a) including the opposite unflared end (22c), being inside one end of the outer sheath (14);

an outer metal shell (24) having an outer hollow cylindrical body (24a) engaged over the inner cylindrical body (22a), the outer hollow cylindrical body (24a) having a flared end (24b) adjacent to but spaced outwardly of the flared end (22b) of the inner cylindrical body (22b), the outer hollow cylindrical body (24a) having a large diameter portion (24d) and an opposite unflared end (24c) at the large diameter portion (24d), the large diameter portion (24d) being over the annular enlargement (22d) of the inner hollow cylindrical body (22a) and the portion of the inner cylindrical body that is inside the one end of the outer sheath (14);

a fixing washer (26) in the space between the flared ends (22b, 24b) of the inner and outer cylindrical bodies (22a, 24a);

the large diameter portion (24d) and unflared end (24c) of the outer hollow cylindrical body (24a) being press fit radially to the annular enlargement (22d) and unflared end (22c) of the inner hollow cylindrical body (22a) with the one end of the outer sheath (14) between portions of the inner and outer shells (22, 24), for positively fixing the shells to the outer sheath (14); and a hollow sleeve (28) having a body (28a) extending around the outer metal shell (24) and one end (28b) fixed to one of the couplers, the body (28a) of the a hollow sleeve (28) having an inner small diameter ring portion (28c) engaged behind the fixing washer (26) for positively securing the shells.

2. The garden hose of claim 1 wherein the length of the hose body is about 25 feet.

3. The garden hose of claim 1 wherein the length of the hose body is about 50 feet.

4. The garden hose of claim 1 wherein the length of the hose body is about 100 feet.

5. The garden hose of claim 1 wherein the length of the hose body is longer than 100 feet.

6. The garden hose of claim 1 further comprising a hollow tapered sleeve having a body extending around the first connector and one end fixed to the first coupler, the sleeve tapering outwardly away from the first coupler to leave room for the hose body to bend freely but within the sleeve near the first coupler.

7. The garden hose of claim 1 further comprising a hollow tapered sleeve having a body extending around the second connector and one end fixed to the second coupler, the sleeve tapering outwardly away from the second coupler to leave room for the hose body to bend freely but within the sleeve near the second coupler.

8. The garden hose of claim 1, wherein the first coupler is a female coupler with a fixed portion connected to the first nipple and a moveable portion movably mounted to the fixed portion.

9. The garden hose of claim 1, wherein the second coupler is a male coupler and comprises a holding disc to help a user firmly hold the second coupler while threading a nozzle or spray head onto the second coupler.

* * * * *